(12) United States Patent
Butler et al.

(10) Patent No.: US 9,904,941 B2
(45) Date of Patent: Feb. 27, 2018

(54) PROVIDING ADVERTISEMENTS IN RESPONSE TO NAVIGATION ON AN ELECTRONIC DEVICE

(75) Inventors: Dominic Butler, Kent (GB); James Mulholland, London (GB); Jon Wallace, Middlesex (GB)

(73) Assignee: Adobe Systems Incorporated, San Jose, CA (US)

( * ) Notice: Subject to any disclaimer, the term of this patent is extended or adjusted under 35 U.S.C. 154(b) by 1988 days.

(21) Appl. No.: 12/206,836

(22) Filed: Sep. 9, 2008

(65) Prior Publication Data
US 2014/0249925 A1    Sep. 4, 2014

(51) Int. Cl.
*G06Q 30/02* (2012.01)
(52) U.S. Cl.
CPC ......... *G06Q 30/0277* (2013.01); *G06Q 30/02* (2013.01)
(58) Field of Classification Search
CPC .. G06Q 30/02; G06Q 30/0264; H04N 21/812; H04N 5/44543; H04H 60/72
USPC ................................. 705/14, 14.64
See application file for complete search history.

(56) References Cited

U.S. PATENT DOCUMENTS

| | | | | |
|---|---|---|---|---|
| 2002/0138834 A1* | 9/2002 | Gerba | ................. | H04N 5/44543 725/42 |
| 2008/0220747 A1* | 9/2008 | Ashkenazi | ............. | G06Q 30/02 455/414.1 |
| 2009/0031338 A1* | 1/2009 | Sharkey | ................. | G06Q 30/02 725/32 |
| 2009/0300674 A1* | 12/2009 | Ratsch | ............... | H04N 5/44543 725/32 |
| 2010/0223643 A1* | 9/2010 | Yuen | .................. | G06Q 30/0241 725/42 |

OTHER PUBLICATIONS

"Yahoo! Go. The best Internet experience for your phone. Period." http://mobile.yahoo.com/go, downloaded from the Internet on Sep. 3, 2008.
"Widsets" http://www.widsets.com/info/more.html downloaded from the Internet on Sep. 3, 2008.
"Adobe—Mobile and devices: Adobe Flash Cast," http://www.adobe.com/mobile/solutions/flashcast/ downloaded from the Internet on Sep. 3, 2008.
"Adobe—Mobile and devices: Adobe Flash Cast 2FAQ" http://www.adobe.com/mobile/solutions/faq/flashcast_faq.html downloaded from the Internet on Sep. 3, 2008.
"Adobe Flash Cast 2, Deliver Engaging, Branded Data Services" Adobe Systems Inc. Datasheet.

* cited by examiner

*Primary Examiner* — William A Brandenburg
(74) *Attorney, Agent, or Firm* — Kilpatrick Townsend & Stockton LLP

(57) ABSTRACT

Certain embodiments involve providing advertisements in response to navigation on an electronic device. On a mobile or other electronic device navigation may be controlled by moving a focus indicator amongst a group of displayed items. Certain embodiments provide an advertisement break between navigation items. When a user crosses the advertisement break by navigating the focus indicator from an item on one side of the advertisement break to an item on the other side, an advertisement is presented to the user.

25 Claims, 3 Drawing Sheets

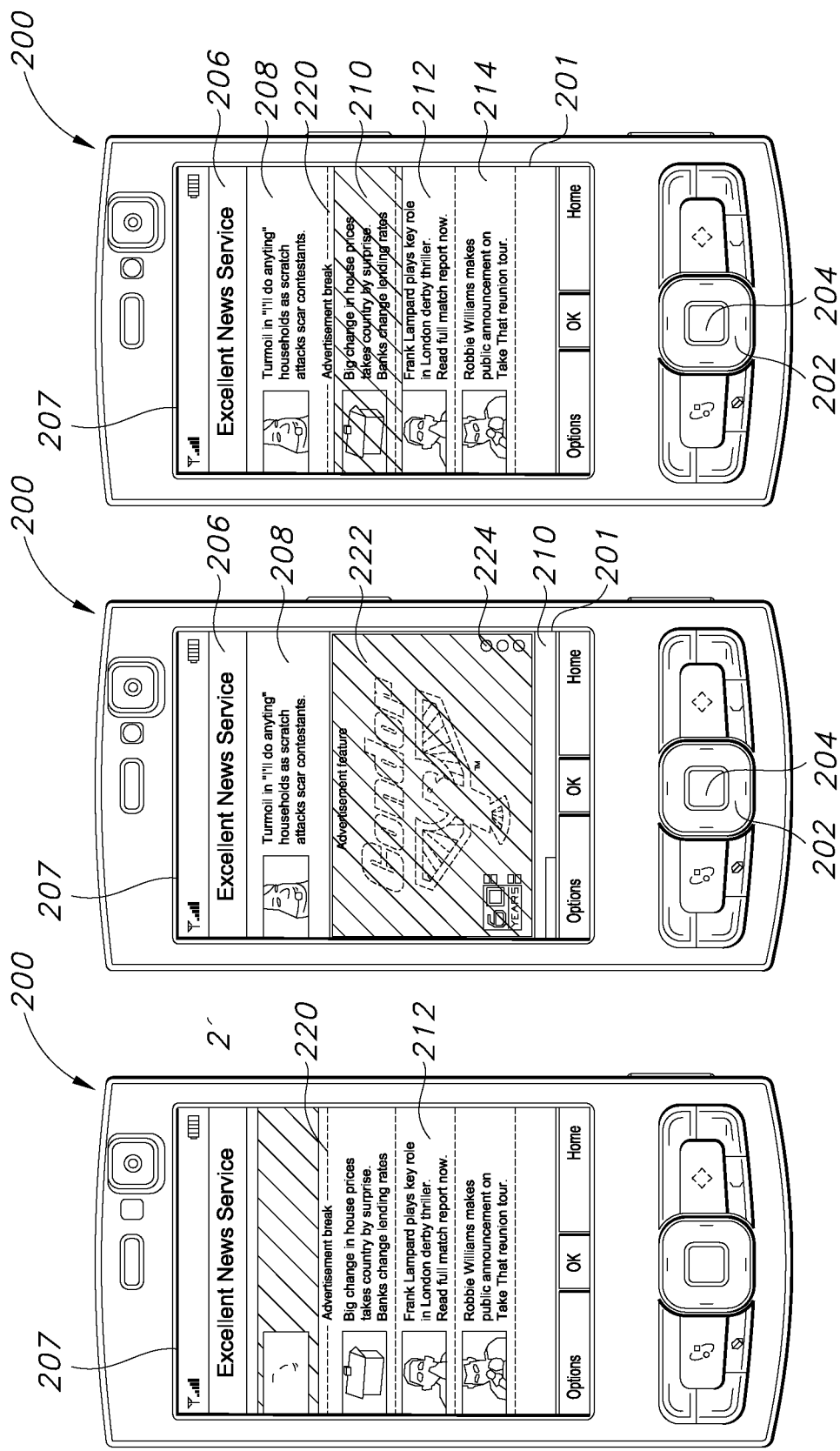

```
┌─────────────────────────────────────────────┐
│ PROVIDING A NAVIGATION AREA COMPRISING A    │
│ PLURALITY OF ITEMS AND A FOCUS INDICATOR    │
│ DISTINGUISHING ONE OR MORE ITEMS FROM       │
│ OTHER ITEMS OF THE PLURALITY OF ITEMS   510 │
└─────────────────────────────────────────────┘
                      │
┌─────────────────────────────────────────────┐
│ PROVIDING AN ADVERTISEMENT BREAK IN A       │
│ LOCATION IN THE NAVIGATION AREA         520 │
└─────────────────────────────────────────────┘
                      │
┌─────────────────────────────────────────────┐
│ RECEIVING A COMMAND TO MOVE THE FOCUS       │
│ INDICATOR FROM A FIRST ITEM TO A SECOND     │
│ ITEM, WHEREIN MOVING FROM THE FIRST ITEM    │
│ TO THE SECOND ITEM CAUSES A MOVEMENT        │
│ PATH OF THE FOCUS INDICATOR TO INTERSECT    │
│ THE ADVERTISEMENT BREAK                 530 │
└─────────────────────────────────────────────┘
                      │
┌─────────────────────────────────────────────┐
│ IN RESPONSE TO THE MOVEMENT PATH OF THE     │
│ FOCUS INDICATOR INTERSECTING THE            │
│ ADVERTISEMENT BREAK, PROVIDING THE          │
│ ADVERTISEMENT ON THE ELECTRONIC DEVICE  540 │
└─────────────────────────────────────────────┘
```

FIG. 5

PROVIDING ADVERTISEMENTS IN RESPONSE TO NAVIGATION ON AN ELECTRONIC DEVICE

FIELD

Embodiments of the present disclosure relate generally to providing content and advertisements to an electronic device.

BACKGROUND

Cell phones and other mobile devices offer a variety of mechanisms for accessing remote content. Such devices commonly include Internet browser applications that allow a user to search for and access Internet content. However, this Internet content search and access process can be time consuming since, in many cases, a user is required to search for content or navigate through multiple web pages and there may be latency involved in the connection between the device and the network. In addition, the content is not available when the mobile device is offline; unable to access the Internet. Some devices include applications that retrieve and cache content for a user so that the user does not need to wait for content to download from a remote source and can access the content even when the device is offline.

Adobe® Flash® Cast™ technology is an offline portal that delivers content as an engaging multimedia experience through Flash® mobile applications called channels. Among other things, it facilitates a subscription form of receiving data for one or more channels on a mobile device. A user can subscribe to a channel using a channel browser that lists the channels available to the device, and can access cached content for subscribed-to channels. To facilitate access of such content, the subscribed-to channels may be presented to a user in a channel lineup on a now-playing screen in which the user is able to preview what is playing on the subscribed-to channels and navigate to and select a particular channel in order to then enjoy the channel's multimedia experience. For example, a news channel may allow a user to navigate through and select from a series of news items that have been previously cached to the mobile device from remote servers; each news item including a thumbnail image, a headline, and a related news story. Upon selection of a news item, the corresponding full body text may be shown. Channels can provide static information and/or interactive content, including content having game, messaging, web interface, and a variety of other components.

SUMMARY

Certain embodiments described herein provide methods and systems for providing advertisements in response to navigation on an electronic device. One exemplary embodiment comprises a method of using an advertisement break to trigger an advertisement during electronic device navigation. The method comprises providing a navigation area for the electronic device. This navigation area comprises displayed items and an input-device-controlled focus indicator that indicates that an item or items are the current focus. For example, such items may be highlighted to distinguish them from other items within the navigation area. The method further comprises providing an advertisement break in a location in the navigation area. An advertisement is triggered when a movement path of the focus indicator intersects the advertisement break. Thus, when input is received to move the focus indicator from a first item to a second item, causing a movement path of the focus indicator to intersect the advertisement break, the advertisement is provided on the electronic device. The advertisement may be displayed in the position of the second item and/or comprise the focus indicator appearance attributes, e.g., appear highlighted, to improve the likelihood that the advertisement will be noticed and interacted with by a user of the device.

In other embodiments, a computer-readable medium (such as, for example, random access memory or a computer disk) comprises code for carrying out these methods.

These embodiments are mentioned not to limit or define the disclosure, but to provide examples of embodiments to aid understanding thereof Embodiments are discussed in the Detailed Description, and further description is provided there. Advantages offered by the various embodiments may be further understood by examining this specification.

BRIEF DESCRIPTION OF THE FIGURES

These and other features, aspects, and advantages of the present disclosure are better understood when the following Detailed Description is read with reference to the accompanying drawings, wherein:

FIG. 2 is an illustration of a mobile device comprising a navigation area with an advertisement break, according to certain embodiments;

FIG. 3 is an illustration of the mobile device of FIG. 2 in which the advertisement has been triggered, according to certain embodiments;

FIG. 4 is an illustration of the mobile device of FIGS. 2 and 3 following display of the advertisement, according to certain embodiments; and FIG. 5 is a flow chart illustrating a method of using an advertisement break to trigger an advertisement during electronic device navigation, according to certain embodiments.

DETAILED DESCRIPTION

Figure 1:
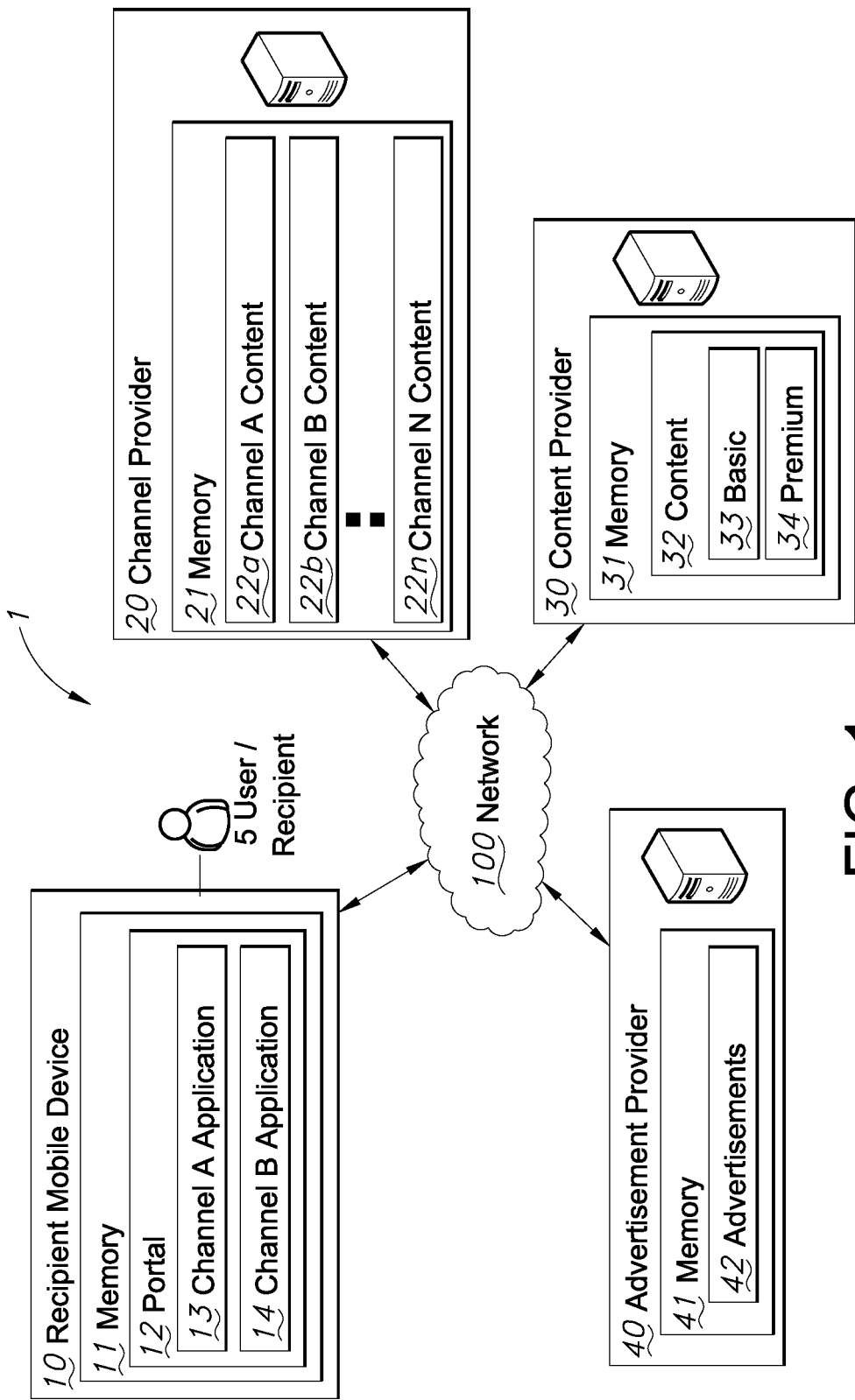
FIG. 1 is a system diagram illustrating an illustrative network environment according to certain embodiments.

Certain embodiments involve providing advertisements in response to navigation on an electronic device. On a mobile or other electronic device navigation may be controlled by moving a focus indicator amongst a group of displayed items. Certain embodiments provide an advertisement break between navigation items. When a user crosses the advertisement break by navigating the focus indicator from an item on one side of the advertisement break to an item on the other side, an advertisement is presented to the user. The advertisement may expand to fill some or all of the portion of the electronic device display that was occupied by the item to which the user was navigating. The presented advertisement may thus be positioned in the user's direct field of vision and may be more likely to be observed than an advertisement located elsewhere. An advertisement that is dynamic, transient, and focused may receive more attention that a static advertisement.

The presented advertisement may further be configured to attract attention, for example, by mimicking the appearance of a substantive content item. As a specific example, a focus indicator may change the color of an item in a list of items to a focus background color to indicate that the item is the current item in focus. As the user navigates through the list, successive items are given the focus background color, including the advertisement that appears when the user navigates across the advertisement break location. Certain embodiments involve placing tantalizing content in sight and requiring user navigation. Advertisement breaks can be placed in the navigation path such that a user cannot avoid these breaks and they get valuable exposure as they form part of the navigation experience and cannot easily be ignored.

When an advertisement break is triggered, an advertisement may be displayed or played for a limited period of time. After the time expires, the device display may return to its expected appearance in which the item to which the user was navigating has the focus indicator. A presentation timer may be used to track that an advertisement is played for a set number of seconds. In other cases, an advertisement may be navigated through by a user; allowing a user to quickly bypass advertisements if desired. In such cases, the dwell time on the advertisement could be recorded.

As a specific example of the uses and benefits of certain embodiments on a mobile phone or other mobile device, a highlight driven interface may be controlled by an all-way navigation controller on the device. While on traditional desktop computing devices there is a mouse that offers random user selection, in contrast on many mobile devices, content must be accessed sequentially; with a focus indicator moving in only a limited number of ways. On a mobile device, a navigation controller may allow a user to move up, down, left, right, and sometimes in diagonal directions. Unlike a personal computer mouse cursor control, the mobile device controller may not allow a user to navigate around or otherwise avoid advertisement breaks that are placed in the navigation path.

Many mobile devices also differ from desktop devices with respect to screen size. Because screen space on a mobile device is often limited, the use of expanding advertisements is well-suited for mobile devices. Triggering the expansion of advertisements using navigation-based advertisement breaks in accordance with certain embodiments thus provides a balance between utilizing screen space for content and providing advertisements to users. Advertisement size and duration can be adjusted as appropriate to provide an acceptable content experience that includes an acceptable advertising experience. Among other things, embodiments described herein thus provide a variety of new opportunities for creating mixed content and advertisement experiences on mobile devices.

Advertisement breaks may be hidden or collapsed until triggered by a user navigation activity. In this sense, an advertisement break can be analogized to a "ha-ha," that is a boundary wall in a ditch that is not readily visible until one is upon or near it. Ha-has were once used to allow home owners to imagine that they owned everything they could see; an illusion that would be spoiled if there were visible walls around their property. Certain embodiments use an analogous concept, in which users may think they have access to all the content they can see when, if fact, there are actually some advertisement barriers that they must cross first. A user must cross over an advertisement break location to focus on a desired item and, once the user crosses that position, they are presented with an advertisement.

Certain embodiments expand advertisements in the flow of a user's channel experience on a channel/cache-based content retrieval system. A "channel" is a placeholder for cached content on a mobile or other electronic device. Channels may be subscription based; such that a user is able to subscribe to the channel and thereafter have the channel's content available from the device's cache. As the user steps or otherwise navigates through the content available on a channel, the user may cross an advertisement break resulting in the display of an advertisement. A variety of other navigation events can also trigger the display of an advertisement. As examples, advertisements may be triggered when a focus indicator crosses an advertisement break within a list, carousel, or item mapping, and/or when a focus indicator switches from one page of an application or channel to another page of an application or channel.

In the case where the user's navigation is visually displayed by highlighting a currently focused item, the advertisement may be presented as a highlighted item in hopes that the user's gaze will follow the highlighting and cause the user to experience the advertisement. Generally, an advertisement can comprise an attribute that makes it appear to be a highlighted item. An advertisement may be a passive item, may be a selectable item that can be selected and navigated within, and/or include external or web site links and functionality to launch other applications, send a message, link to another channel such as an all advertisement channel, etc. User interaction with an advertisement may be tracked to provide valuable consumer data.

A displayed advertisement may be displayed for a present period of time. For example, an advertisement may play for three seconds after an advertisement break is crossed. During these three seconds, the advertisement may change or otherwise indicate the limited duration of the advertisement. For example, a three second advertisement may include a displayed counter that displays "3" then "2" then "1" and then "0" as the advertisement is automatically removed.

Illustrative Network Configuration

Referring now to the drawings in which like numerals indicate like elements throughout the several Figures, FIG. 1 is a system diagram illustrating an illustrative network environment according to certain embodiments. Other embodiments may be utilized. The environment 1 shown in FIG. 1 comprises a wired or wireless network 100 connecting various network devices 10, 20, 30, 40. Applications that execute on each of the devices 10, 20, 30, 40 are shown as functional or storage components residing in memory 11, 21, 31, 41 on the respective devices. As is known to one of skill in the art, such applications may be resident in any suitable computer-readable medium and execute on any suitable processor. For example, the network devices 10, 20, 30, 40 shown each may comprise a computer-readable medium such as a random access memory (RAM) 11, 21, 31, 41, coupled to a processor that executes computer-executable program instructions stored in memory 11, 21, 31, 41. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

Recipient mobile device 10 may be used by a mobile device user/recipient 5 to receive content through a channel provider 20 and originating from a content provider 30. The recipient mobile device 10 may also receive advertisements from advertisement provider 40. In this example, recipient mobile device 10 comprises a portal 12 for managing content received for a plurality of channels. Each channel may be controlled by its own application, in this example, channel A application 13 and channel B application 14, and the portal 12 may facilitate navigation amongst different channel applications 13, 14 and within a given channel application 13, 14. For example, the mobile device user 5 may use the portal 12 to select channel A. Once selected, the channel A application 13 may allow the user 5 to preview and select from the content currently playing or otherwise available on Channel A. The channel A application 13 may display items for those currently playing pieces of content in a navigation area and allow the user to navigate through the items to preview and select a desired piece of content. Upon selection of a piece of content from within such a navigation area, the channel A application 13 provides the rest of the piece of content. For example, the navigation area may comprise an image thumbnail and an article title as an item, which, upon selection, provides the remainder of the article.

A navigation area provided by a channel application may also comprise one or more advertisement breaks. As the user navigates within the navigation area and crosses or otherwise intersects such navigation breaks, advertisements are triggered. For example, the channel application may provide a vertical list of items. As the user navigates sequentially down the items of the list, a focus indicator may indicate the user's current position within the list. When the focus indicator crosses an advertisement break the display may switch to display an advertisement before returning to the expected list display.

The content for a channel may be cached on the recipient mobile device 10. For example, a channel application may periodically retrieve content for a channel and store the current content as part of the application within the memory 11 on the recipient mobile device 10. When new content is received for a given channel, the new content can replace some or all of the previously cached content for the channel on the recipient mobile device 10. The recipient mobile device may also cache advertisement content with a channel application 13, 14, within the portal 12, or elsewhere in its memory 11. A channel application 13, 14 may comprise all advertising content.

A channel provider 20 may collect channel content 22 and store such content in memory 20. The channel provider may provide such channel content 22 to subscribers on electronic devices connected at least periodically, for example, through a network 100. A channel provider may comprise more channels than a given electronic device subscribes to and may comprise mechanisms for managing the subscription and access to channel content.

A content provider 30 comprises a memory 31 that stores and distributes content 32 that will be included in a channel's content and ultimately provided to channel subscribers on electronic devices. Similarly, an advertisement provider 40 can store and distribute advertisements 42 that will be included in a channel's content and ultimately provided to channel subscribers on electronic devices. A single physical device, logical unit, or business unit can, of course, house one or more channel providers, content providers, and advertisement providers. The components are shown here as single, isolated components for illustrative purposes only.

Illustrative Advertisement Break on a Mobile Device

FIGS. 2-4 illustrate the use of a navigation-triggered advertisement, according to certain embodiments. FIG. 2 is an illustration of a mobile device 200 displaying a channel title 206 and a navigation area 201. The navigation area 201 comprises a vertical list of items 208, 210, 212, 214 for the channel and includes an advertisement break indicator graphic 220 between two of the items of the list 208, 210. In certain embodiments, an advertisement break is not visible and is thus not displayed as a graphic. One of the items 208 has the control focus of the mobile device and thus comprises a focus indicator. In this case, the background of the item 208 is a different color from the background of the other items 210, 212, 214.

The mobile device 200 also includes a control device 202 for controlling the movement of the focus indicator and a selector device 204 for selecting an item that has the current control focus. A user can use these physical controls 202, 204 to navigate through interfaces on the mobile device 200 and, in this case, move the focus indicator up and down in the navigation area 201. As a specific example, a user can press an up command on the control device 202 to move the focus indicator to the item in the list that is above a presently focused item. This type of control generally does not allow the user to navigate directly to non adjacent items, i.e., a user cannot skip from the top item in a ten item list directly to the bottom item and instead must move down the list from the top item to the second item to the third item, etc.

FIG. 3 is an illustration of the mobile device of FIG. 2 in which the advertisement has been triggered, according to certain embodiments. For example, the user may have pressed the down command on the control device 202 to move the focus indicator towards the second item 210 in the navigation area. However, because the path of the focus indicator from the first item 208 to the second item 210 intersects the advertisement break located at the advertisement break indicator graphic 220, the advertisement 220 is triggered for display. In this case, the advertisement 220 is positioned within the navigation area 206 and in a position that at least partially overlaps the position in which the second item 210 was located in FIG. 2, prior to the navigation. The advertisement is also given an appearance attribute that makes it appear to have a focus indicator on it, in this case, the background color of the advertisement 220 is the same as the background color of the focus indicator. These advertisement location and appearance attributes may, in certain embodiments, improve the likelihood that the user will observe the advertisement.

The advertisement shown in FIG. 3 is displayed for a short period of time. During this time the advertisement includes a count down timer 224 that visually indicates the remaining time that the application will be displayed. In FIG. 3, the count down timer 224 appears as three dots indicating that there are three seconds remaining. As time passes the dots will progressively disappear and when time is up the advertisement 224 is removed. For example, the advertisement may collapse to a collapsed state of an advertisement break icon 220.

FIG. 4 is an illustration of the mobile device of FIGS. 2 and 3 following display of the advertisement, according to certain embodiments. As shown, the advertisement has collapsed to advertisement break icon 220 and the focus indicator is now positioned on the second item 210 in the list. If the user wishes to return to the advertisement 220 or back to the first item, the navigation path of the focus indicator will again cross the advertisement break and trigger an advertisement. In certain embodiments, a different embodiment may be displayed each time an advertisement break is crossed. Advertisements may also be provided in cycles and other patterns. In certain embodiments, an advertisement will only be presented when a user crosses an advertisement break in a certain direction, e.g., going down a list but not going up a list.

The advertisement may be selected at the mobile device or elsewhere based on the subject matter of the channel or one or more particular items within the channel. For example, as the user navigates from the first item 208 to the second item 210 and thereby crosses an advertisement break, an advertisement may be provided based on the subject matter of the second item 210. In this case an advertisement that is related to the "Big change in house prices takes country by surprise. Banks change lending rates." text of the second item may be selected based on keywords within the text or may have been pre-selected by the channel provider for that particular item. A user expecting the focus indicator to identify a news item about banks and lending rates may be more likely to observe an advertisement about lending rates, especially when the advertisement is in the position that the user expects to see the news item. Similarly, if the user is crossing the same advertisement break in a different direction, from the second item 210 to the first item 208, the advertisement may be selected based on the content of the first item 208.

Illustrative Methods of Accessing a Rating Associated with a Piece of Media

FIG. 5 is a flow chart illustrating a method of using an advertisement break to trigger an advertisement during electronic device navigation, according to certain embodiments. For purposes of illustration only, the elements of this method are described with respect to a particular implementation and with respect to exemplary components illustrated in FIG. 1. A variety of other implementations are also possible.

The method shown in FIG. 5 comprises providing a navigation area comprising a plurality of items and a focus indicator distinguishing one or more items from other items of the plurality of items, as shown in block 510. Generally, at least a portion of the navigation area is displayed on the electronic device and input on the electronic device moves the focus indicator. An example of an electronic device is the recipient mobile device 10 of FIG. 1. The portal 12 and/or channel applications 13, 14 of the recipient mobile device 10 may provide a navigation area that displays a plurality of items. Such items may correspond, for example, to cached items, including but not limited to cached items corresponding to cached content received on the electronic device from a channel provider 20. A navigation area may be displayed on a variety of devices including a mobile device. Some of such devises may comprise an input device that allows movement of the focus indicator between adjacent items of the plurality of items of the navigation area. Such an input device may be unable to move the focus indicator directly between non-adjacent items. In an exemplary use of the present method with such input devices, the navigation area may provide a list of the plurality of items and the input device may restrict movement of the focus indicator up and down in the list in single step increments.

The method shown in FIG. 5 further comprises providing an advertisement break in a location in the navigation area, as shown in block 520. An advertisement is triggered when a movement path of the focus indicator intersects the advertisement break. Providing an advertisement break in a location in the navigation area may or may not comprise displaying a visual indicator of the advertisement break in the navigation area. Thus, an advertisement break may be completely hidden from a user of the electronic device. Advertisement breaks may be placed in predetermined positions, runtime determined positions, randomly, or in any other suitable manner. The position of an advertisement break may also change over time.

The method shown in FIG. 5 further comprises receiving input to move the focus indicator from a first item to a second item, wherein moving from the first item to the second item causes the movement path of the focus indicator to intersect the advertisement break, as shown in block 530.

The method shown in FIG. 5 further comprises providing the advertisement on the electronic device, as shown in block 540. This occurs in response to the movement path of the focus indicator intersecting the advertisement break. The advertisement may be provided for a predetermined length of time and/or until input is received on the electronic device. When the advertisement is finished, the focus indicator may be moved to the second item. The advertisement may be interactive and comprise, as examples, a link to content external to the electronic device, a link to content within the electronic device, and/or an icon for triggering the launch of an application or another channel.

Providing an advertisement on the electronic device may comprise displaying the advertisement within the portion of the navigation area that is displayed on the electronic device. The focus indicator may be positioned on the advertisement while the advertisement is displayed. This may also be achieved by giving the advertisement an appearance attribute that makes the advertisement appear to have the focus indicator. When an advertisement is displayed, it may appear to expand in a position between two items. For example, if a user is moving down a list from a first item to a second item and crosses an advertisement break, an advertisement may expand and fill a position within the list where the advertisement break is located. The advertisement may appear between the first and second items and may have appearance attributes that make the advertisement appear to be a part of the list. In certain cases, the position of the advertisement may be the same as the second items' prior position, i.e., the second item's position immediately prior to the input to move the focus indicator from the first item to the second item.

General

Certain embodiments relate to the use of a navigation-triggered advertisements on mobile devices. These are merely illustrative and the techniques described herein have uses in other embodiments, including on a variety of different television and computing devices. In short, the techniques for advertising and the other features described herein have uses in a variety of contexts, not to be limited by the specific illustrations provided herein. It should also be noted that embodiments may comprise systems having different architecture and information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

In addition, with respect to the computer implementations depicted in the Figures and described herein, certain details, known to those of skill in the art, have been omitted. For example, software tools and applications that execute on each of the devices and functions performed thereon are shown as functional or storage components on the respective devices. As is known to one of skill in the art, such applications may be resident in any suitable computer-readable medium and execute on any suitable processor. For example, computing and media consuming devices each may comprise a computer-readable medium such as a random access memory (RAM), coupled to a processor that executes computer-executable program instructions stored in memory. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage or transmission device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. A computer-readable medium may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, JavaScript, and Adobe® Actionscript.

While the network 100 may comprise the Internet, in other embodiments, other networks, such as an intranet, or no network may be used. Moreover, methods may operate within a single device. Devices can be connected to a network 100 as shown. Alternative configurations are of course possible. The devices may also comprise a number of external or internal devices such as a mouse, a CD-ROM, DVD, a keyboard, a remote control, a display, or other input or output devices. Examples of devices are personal computers, digital assistants, personal digital assistants, cellular phones, mobile phones, smart phones, pagers, digital tablets, laptop computers, Internet appliances, other processor-based devices, and television viewing devices. In general, a device may be any type of processor-based platform that operates on any operating system capable of supporting one or more client applications or media content consuming programs.

That which is claimed:

1. A computer implemented method comprising:
   providing a navigation area for an electronic device, the navigation area comprising a plurality of items, wherein a focus indicator distinguishes one or more items from other items of the plurality of items within the navigation area, wherein at least a portion of the navigation area is displayed on the electronic device and input on the electronic device moves the focus indicator;
   providing an advertisement break in a location in the navigation area between a first item and a second item;
   receiving input to move the focus indicator from the first item to the second item;
   determining, by a processor of a computer system, an intersection of a movement path of the focus indicator and the advertisement break as the focus indicator moves from the first item to the second item;
   wherein the focus indicator can only move from the first item to the second item via the movement path intersecting the advertisement break; and
   in response to determining the intersection of the movement path and the advertisement break, providing an advertisement on the electronic device, the advertisement in an un-displayed state prior to determining the intersection of the movement path and the advertisement break.

2. The method of claim 1, wherein providing the advertisement on the electronic device comprises providing the advertisement for a predetermined length of time and moving the focus indicator to the second item at the conclusion of the predetermined length of time.

3. The method of claim 1, wherein providing the advertisement on the electronic device comprises providing the advertisement until input is received on the electronic device.

4. The method of claim 1, wherein the advertisement is interactive and comprises one or more of a link to content external to the electronic device, a link to content within the electronic device, and a trigger item for triggering the launch of an application or channel.

5. The method of claim 1, wherein providing the advertisement on the electronic device comprises displaying the advertisement within the portion of the navigation area that is displayed on the electronic device.

6. The method of claim 5, wherein the focus indicator is on the advertisement while the advertisement is displayed.

7. The method of claim 5, wherein a position of the advertisement is the same as a prior second item position, the prior second item position comprising a position of the second item immediately prior to receiving input to move the focus indicator from the first item to the second item, wherein the second item is shifted in a direction while the advertisement is displayed in the position of the advertisement that is the same as the prior second item position and the second item returns to the prior second item position after the advertisement has been displayed.

8. The method of claim 1, wherein providing an advertisement break in a location in the navigation area comprises displaying a visual indicator of the advertisement break in the navigation area.

9. The method of claim 1, wherein the navigation area does not comprise a visual indicator of the advertisement break.

10. The method of claim 1, wherein items of the plurality of items correspond to cached content on the electronic device.

11. The method of claim 10, wherein the items of the plurality of items correspond to content for a channel, the content for the channel provided from a channel provider remote from the electronic device based on a subscription to the channel.

12. The method of claim 1, wherein the electronic device is a mobile device.

13. The method of claim 1, wherein the electronic device comprises an input device that allows movement of the focus indicator between adjacent items of the plurality of items of the navigation area, the input device unable to move the focus indicator directly between non-adjacent items.

14. The method of claim 13, wherein the navigation area provides a list of the plurality of items and the input device allows movement of the focus indicator up and down in the list.

15. A computer implemented method comprising:
   receiving a channel at a mobile device;
   receiving an advertisement at the mobile device;
   providing a channel application on the mobile device, a navigation area of the channel application comprising a plurality of items, the items of the plurality of items corresponding to content for the channel, wherein a focus indicator distinguishes one or more items from other items of the plurality of items within the navigation area, wherein at least a portion of the navigation area is displayed on the mobile device and input on the mobile device moves the focus indicator; and providing an advertisement break in a location in the navigation area;

triggering, by a processor of a computer system, an advertisement when a movement path of the focus indicator intersects the advertisement break, the advertisement in an un-displayed state prior to the movement path of the focus indicator intersecting the advertisement break and wherein the focus indicator can only move from a first item to a second item via the movement path intersecting the advertisement break.

16. The method of claim 15, wherein the channel application receives a plurality of advertisements and selects an advertisement based on the channel.

17. The method of claim 15, wherein the channel application receives a plurality of advertisements and selects an advertisement based on an item in the plurality of items.

18. An electronic device system comprising:
a memory;
a processor; and
wherein the memory is encoded with one or more applications that, when performed on the processor, cause the system to perform the operations comprising:
providing a navigation area for the electronic device, the navigation area comprising a plurality of items, wherein a focus indicator distinguishes one or more items from other items of the plurality of items within the navigation area, the navigation area comprising an advertisement break, wherein the advertisement is triggered when a movement path of the focus indicator intersects the advertisement break;
moving the focus indicator in response to receiving input; and
recognizing the movement path of the focus indicator that intersects the advertisement break, the advertisement in an un-displayed state prior to the recognizing and wherein the focus indicator can only move from a first item to a second item via the movement path intersecting the advertisement break; and
in response to the recognizing, providing the advertisement on the electronic device.

19. The electronic device system of claim 18 further comprising an input device that allows movement of the focus indicator between adjacent items of the plurality of items of the navigation area, the input device unable to move the focus indicator directly between non-adjacent items.

20. The electronic device system of claim 19, wherein the operations further comprise providing a list of the plurality of items in the navigation area and the input device allows movement of the focus indicator up and down in the list.

21. The electronic device system of claim 19, wherein the electronic device is a mobile device.

22. A non-transitory computer-readable medium on which is encoded program code, wherein, when executed by a processor, the program code performs operations comprising:
providing a navigation area for an electronic device, the navigation area comprising a plurality of items, wherein a focus indicator distinguishes one or more items from other items of the plurality of items within the navigation area, wherein at least a portion of the navigation area is displayed on the electronic device and input on the electronic device moves the focus indicator;
providing an advertisement break in a location in the navigation area, wherein an advertisement is triggered when a movement path of the focus indicator intersects the advertisement break;
receiving input to move the focus indicator from a first item to a second item, wherein moving from the first item to the second item causes the movement path of the focus indicator to intersect the advertisement break, the advertisement in an un-displayed state prior to the movement path of the focus indicator intersecting the advertisement break and wherein the focus indicator can only move from the first item to the second item via the movement path intersecting the advertisement break; and
in response to the movement path of the focus indicator intersecting the advertisement break, providing the advertisement on the electronic device.

23. The method of claim 1, wherein providing the advertisement break in the location in the navigation area comprises providing the advertisement break at a predetermined position or providing the advertisement break at a random position.

24. The computer implemented method of claim 1, wherein providing the advertisement on the electronic devices includes displaying the advertisement in at least a sub-portion of the portion of the navigation area of the electronic device, the advertisement, when displayed, in a position that at least partially overlaps a second position occupied by the second item prior to determining the intersection of the movement path and the advertisement break.

25. The computer implemented method of claim 1, wherein providing the advertisement on the electronic devices includes triggering an expansion of the advertisement on the electronic device in response to determining the intersection of the movement path and the advertisement break.

* * * * *